United States Patent
Shearer et al.

(10) Patent No.: US 10,947,167 B2
(45) Date of Patent: *Mar. 16, 2021

(54) BIOCHAR

(71) Applicant: Full Circle Biochar, Inc., San Francisco, CA (US)

(72) Inventors: David Shearer, San Francisco, CA (US); John Gaunt, Ithaca, NY (US); George Vernon Corder Peacocke, Belfast (GB)

(73) Assignee: Full Circle Biochar, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/355,726

(22) Filed: Mar. 16, 2019

(65) Prior Publication Data

US 2019/0315662 A1 Oct. 17, 2019

Related U.S. Application Data

(63) Continuation of application No. 14/968,505, filed on Dec. 14, 2015, now Pat. No. 10,233,131, which is a (Continued)

(51) Int. Cl.
*C05F 11/00* (2006.01)
*B01J 20/20* (2006.01)
(Continued)

(52) U.S. Cl.
CPC ............... *C05F 11/00* (2013.01); *B01J 20/20* (2013.01); *B01J 20/28057* (2013.01); *B01J 20/28078* (2013.01); *B01J 20/28088* (2013.01); *B01J 20/3078* (2013.01); *C01B 32/05* (2017.08); *C01B 32/336* (2017.08); *C05B 17/00* (2013.01); *C05C 11/00* (2013.01); *C05D 1/00* (2013.01);
(Continued)

(58) Field of Classification Search
CPC .................................. C05F 11/00; B01J 20/20
See application file for complete search history.

(56) References Cited

U.S. PATENT DOCUMENTS

| 8,361,186 B1 * | 1/2013 | Shearer ...................... C05F 5/00 71/32 |
| 8,747,797 B2 * | 6/2014 | Shearer ...................... C05F 5/00 423/445 R |

(Continued)

*Primary Examiner* — Wayne A Langel
(74) *Attorney, Agent, or Firm* — Randall L. Reed; Miller Mayer LLP

(57) ABSTRACT

The invention provides for methods, devices, and systems for pyrolyzing biomass. A pyrolysis unit can be used for the pyrolysis of biomass to form gas, liquid, and solid products. The biomass materials can be selected such that an enhanced biochar is formed after pyrolysis. The biomass can be pyrolyzed under specified conditions such that a selected biochar core is formed. The pyrolysis process can form a stable biochar core that is inert and/or resistant to degradation. The biochar or biochar core can be functionalized to form a functionalized biochar or functionalized biochar core. Functionalization can include post-pyrolysis treatments such as supplementation with microbes or physical transformations including annealing and/or activation.

20 Claims, 1 Drawing Sheet

Related U.S. Application Data continuation of application No. 14/297,249, filed on Jun. 5, 2014, now Pat. No. 9,394,239, which is a continuation of application No. 13/748,164, filed on Jan. 23, 2013, now Pat. No. 8,747,797, which is a continuation of application No. 12/796,629, filed on Jun. 8, 2010, now Pat. No. 8,361,186.

(60) Provisional application No. 61/185,141, filed on Jun. 8, 2009.

(51) Int. Cl.

| | |
|---|---|
| C09K 17/16 | (2006.01) |
| C09K 17/04 | (2006.01) |
| C05G 3/80 | (2020.01) |
| B01J 20/30 | (2006.01) |
| B01J 20/28 | (2006.01) |
| C01B 32/05 | (2017.01) |
| C01B 32/336 | (2017.01) |
| C05F 5/00 | (2006.01) |
| C05F 3/00 | (2006.01) |
| C05F 11/08 | (2006.01) |
| C05G 1/00 | (2006.01) |
| C05F 11/02 | (2006.01) |
| C05G 5/00 | (2020.01) |
| C05F 1/00 | (2006.01) |
| C05F 7/00 | (2006.01) |
| C05F 9/00 | (2006.01) |
| C05B 17/00 | (2006.01) |
| C05C 11/00 | (2006.01) |
| C05D 1/00 | (2006.01) |
| C05D 3/00 | (2006.01) |
| C05D 5/00 | (2006.01) |
| C05D 9/00 | (2006.01) |
| C05D 9/02 | (2006.01) |
| C05F 3/04 | (2006.01) |

(52) U.S. Cl.
CPC ............... *C05D 3/00* (2013.01); *C05D 5/00* (2013.01); *C05D 9/00* (2013.01); *C05D 9/02* (2013.01); *C05F 1/00* (2013.01); *C05F 3/00* (2013.01); *C05F 5/00* (2013.01); *C05F 7/00* (2013.01); *C05F 9/00* (2013.01); *C05F 11/02* (2013.01); *C05F 11/08* (2013.01); *C05G 1/00* (2013.01); *C05G 5/00* (2020.02); *B01J 2220/4812* (2013.01); *C05F 3/04* (2013.01); *Y02A 40/20* (2018.01); *Y02P 20/145* (2015.11)

(56) References Cited

U.S. PATENT DOCUMENTS

| | | | | |
|---|---|---|---|---|
| 9,328,032 | B2* | 5/2016 | Shearer | C05F 5/00 |
| 2008/0016769 | A1* | 1/2008 | Pearson | C10J 3/466 |
| | | | | 48/197 R |
| 2009/0126433 | A1* | 5/2009 | Piskorz | C05D 9/00 |
| | | | | 71/25 |
| 2010/0257775 | A1* | 10/2010 | Cheiky | C10B 53/02 |
| | | | | 44/280 |

* cited by examiner

BIOCHAR

CROSS-REFERENCE

This application is a continuation application of U.S. patent application Ser. No. 14/968,505, filed on Dec. 14, 2015, now issued as U.S. Pat. No. 9,328,032, which is a continuation application of U.S. patent application Ser. No. 14/297,349, filed on Jun. 5, 2014, which is a continuation application of U.S. patent application Ser. No. 13/748,164, filed Jan. 23, 2013, now issued as U.S. Pat. No. 8,747,797, which is a continuation application of U.S. patent application Ser. No. 12/796,629, filed Jun. 8, 2010, now issued as U.S. Pat. No. 8,361,186, which claims the benefit of U.S. Provisional Application No. 61/185,141, filed Jun. 8, 2009, each of which is entirely incorporated herein by reference.

BACKGROUND OF THE INVENTION

Increasing agricultural production in a sustainable way and mitigating the effects of climate change are two of the most important challenges facing the modern world. These challenges include a need for higher crop yields, a need to make degraded soils more productive, and a need to manage for productive agriculture with less dependable water resources. Some efforts have been made to reduce the long-term negative effects of agriculture by crop-rotation and organic farming. Efforts have been made to address climate change by reducing avoidable greenhouse gas emissions through production of renewable energy and offsetting unavoidable emissions through sequestration of carbon in the environment. Some carbon sequestration efforts have been aimed at storage of carbon in soil and of carbon dioxide in geologic formations. However, due to the inherent lack of long-term stability of plant derived biomass storage of carbon derived directly from plant biomass is not a long-term solution. Pyrolysis of biomass to produce a solid material called char, charcoal or more specifically biochar, which can be a product that is tailored for use as a soil amendment, can play a significant role in both of these efforts related to climate change and agriculture, but is currently limited by the use of biochars that exhibit instability or degradation and which may have positive or negative effects on soil flora, fauna and/or plant growth. Therefore, there is a need for improved methods, devices, and systems for the'production of stable and/or beneficial biochars.

SUMMARY OF THE INVENTION

The invention provides for methods, devices, and systems for pyrolyzing biomass and producing enhanced and/or functionalized biochar. A pyrolysis unit can be used for the pyrolysis of biomass to form gas, liquid, and solid products. The biomass can be pyrolyzed under specified conditions such that a selected biochar core, also referred to as biocore elsewhere herein, is formed. The pyrolysis process can form a stable biochar core that is inert and/or resistant to degradation.

One aspect of the invention provides for a method for producing a selected type of biochar core comprising the steps of introducing, a biomass feedstock to a pyrolysis unit and pyrolyzing the biomass in the pyrolysis unit in accordance with a predetermined set of operating parameters attuned to the selected biomass feedstock to produce the selected type of biochar core. The predetermined set of operating parameters can include, pre or post pyrolysis treatments of biochar as well as an established temperature range and rate of temperature change that corresponds to the selected type of biochar core. The invention also provides for systems and methods that include pro and/or post pyrolysis treatments of biochars.

Another aspect of the invention provides for the production of enhanced and/or functionalized biochar. Enhanced biochar can be produced by blending, mixing, other otherwise combining selected feed materials such that a selected biochar is formed by pyrolysis. Functionalized biochar can include, for example, a biocore that has been supplemented with a microbe or a nutrient or an organic substance.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

The invention provides for methods, devices, and systems for pyrolyzing biomass. A pyrolysis unit can be used for the pyrolysis of biomass to form gas, liquid, and solid products. The gas, liquid, and solid products can be syngas (the non-condensable, permanent gases including CO, $CO_2$, $CH_4$, $H_2$ and higher hydrocarbons of formula. $C_xH_y$ which can be gaseous at 20.degree. C. and atmospheric pressure), bio-oil (also referred to as pyrolysis liquids, pyroligneous acid, bio-fuel-oil, pyrolysis tars), and char, charcoal, biocarbon, agrichar, biochar, enhanced biochar, or biocore (also referred to as biochar core elsewhere herein), respectively.

Figure 1:
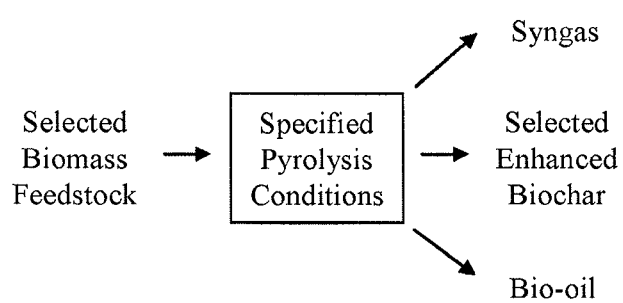
FIG. 1 shows a diagram of a process for producing an enhanced biochar.

As shown in FIG. 1, selected biomass materials, can be pyrolyzed at specified pyrolysis conditions to form selected enhanced biochars. The selection of biomass materials and/or the specified pyrolysis conditions can be altered to produce a variety of enhanced biochars that can be tailored to a variety of applications, described herein.

Figure 2:
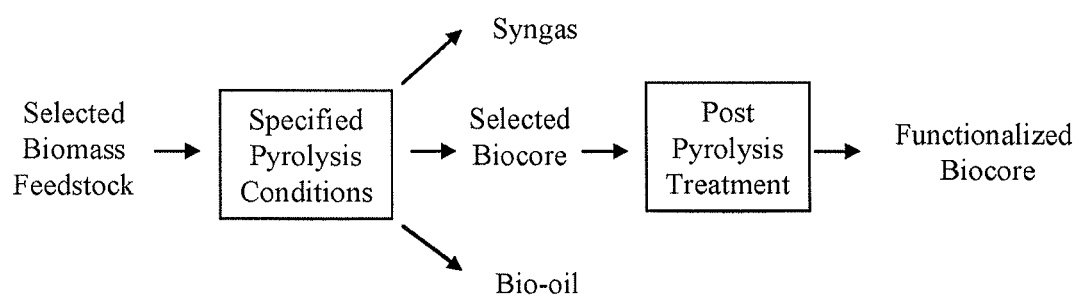
FIG. 2 shows a diagram of a process for producing a functionalized biochar.

As shown in FIG. 2, selected biomass materials can be pyrolyzed under specified conditions such that one or more selected biocores are formed. The pyrolysis process can form one or more stable biocores that are inert and/or resistant to degradation. The biocores can be configured, for example by blending with a supplement, for use as a soil amendment, as a potting mix, as a substitute in a growing media (including peat and/or compost media), as a horticultural media, as a carbon sequestration agent, a mitigant for soil greenhouse gas emissions, a fertilizing agent, a landscaping amendment, a turfgrass establishment, a bioremediation agent, a delivery agent for fungi or bacterial populations, or any combination thereof and not limited to the supplements listed. The biochar cores can be further tailored, enhanced and/or functionalized using a variety of methods, systems and processes described herein. In some embodiments of the invention, the biocores can be tailored, enhanced, and/or functionalized to a particular end use or application.

I. Biomass

The biomass used for formation of pyrolysis products can be obtained from a variety of sources. The biomass can be any material containing organic carbon. For example, the biomass can be plant material, cellulosic materials, lignin containing material, animal by-products, organic wastes, landfill matter, marine waste, agricultural waste, animal or human waste, other naturally derived sources of carbon, or any combination thereof. The biomass materials can also include compost, sewage sludge, or vinasse. Biomass materials can be blended to form a biomass feedstock. For example, biomass obtained from a softwood (e.g., a pine tree) or a hardwood (e.g., and oak tree) can be blended with poultry litter and then pyrolyzed. In some embodiments, metals or other chemicals can be blended with the biomass prior to pyrolysis. Examples of the pyrolysis of poultry litter and animal waste are described in JP2001252558, U.S. Pat. No. 6,189,463 and U.S. Patent Publication No. 2009/0031616, each of which are incorporated herein by reference in its entirety.

In some embodiments of the invention, the biomass is selected based on the chemical content of the material, the elemental composition of the biomass, or the content of its elemental composition. For example, a biomass can be selected on its content of carbon, hydrogen, oxygen, nitrogen, phosphorous, potassium, selenium, cobalt, iron, manganese or any combination thereof in the biomass and any other elements. The biomass can be selected based on the content of water, oil, hydrocarbons, volatile compounds, organic carbon, volatile organic carbons, or any combination thereof. Any of these content parameters can be selected to be higher, lower, or up to about 1, 5, 10, 15, 20, 25, 40, 50, 60, 70, 80, 85, 90, 95, or 99% by weight or volume.

In some embodiments of the invention, the biomass feedstock can be selected based on the energy content of the biomass materials. The energy content of the biomass feedstock, determined by the biomass materials used, can be at least, up to, greater than, or less than about 1, 5, 10, 15, 20, 25, or 30 GJ/ton, which can be measured on a dry (such as atmospheric or oven dry) weight or dry as free basis. In some embodiments of the invention, the biomass feedstock can be elected based on the particle size and shape of the biomass materials. The particle size and shape of the biomass feedstock can be controlled by cutting, crushing, grinding, screening or breaking of a biomass material. For example, trees can be chipped and/or ground to a particular particle size and then fed to a pyrolysis unit.

Selection of the biomass feedstock can allow for the formation of predetermined pyrolysis products. For example, a biomass feedstock can be formed from a crop such as switchgrass or miscanthus or a crop by-product such as corn stover and a biomass material with high nutrient content, such as manure or rapemeal, to form biochar that may be used as a nutrient source. As another example, wood or high ash feedstocks (including feedstocks having greater than about 5% ash) can be supplemented to a biomass material to enhance the production of liquid pyrolysis products.

Pretreatment of biomass can relate to physical preparation of the biomass and may include drying (air, steam, warm exhaust gases or other), size reduction (milling, grinding, chopping, shredding), and/or screening to a certain size fraction or range of size fractions. Biomass can also be pretreated by the addition of elements and/or compounds, reacted with chemicals to reduce or remove any of the biomass constituents (including acid washing, alkali treatment, hot water washing, cold water washing, steam exposure, washing with an organic solvent, and/or dissolution in ionic liquids). Biomass can also be thermally treated after drying to reduce its degree of polymerization, remove volatile compounds and/or extractives. This process can sometimes be called conditioning or torrefaction. In some embodiments of the invention, conditioning or torrefaction can be performed at temperatures lower than typical pyrolysis temperatures.

The biomass materials can be selected such that the pyrolysis products include an enhanced biochar or enhanced biochar core. The enhanced biochar or biochar core can be used for a variety of applications, including any application described herein. The enhanced biochar or biochar core can also be functionalized to form a functionalized and/or enhanced biochar core.

II. Pyrolysis

The invention provides for a pyrolysis unit that can be used for formation of pyrolysis products from a biomass feedstock. The pyrolysis unit, can control the pyrolysis conditions of the biomass feedstock such that selected types of pyrolysis products are formed. In some embodiments of the invention, a selected type of biochar core is formed from a selected biomass feedstock. The biochar core can be a stable biochar core that is inert and/or resistant to degradation, for example microbial, biological, chemical, thermal and/or oxidative degradation. The pyrolysis unit can be a gasifier or reactor, as described in U.S. Pat. Nos. 6,830,597 and 6,902,711, each of which are incorporated herein by reference in their entirety. Solid pyrolysis products, including biochar, that can be formed using the methods and devices described herein can also be referred to as pyrolysis char, charcoal, bio-carbon, or other similar names.

The pyrolysis unit can be operated in a batch, continuous, or semi-continuous mode. A biomass feedstock can be supplied or introduced to the pyrolysis unit, the biomass feedstock can be heated and/or pyrolyzed in the closed pyrolysis unit to form pyrolysis products, and then the pyrolysis unit can be opened for the removal of the pyrolysis products. The biomass feedstock can also be left in the pyrolysis unit until it has been partially or fully pyrolyzed and cooled down, with removal of gas and vapor during pyrolysis; retention of all products inside the reactor until it has cooled down, or partial removal of the gas and vapor products during the pyrolysis process.

The pyrolysis products can be a selected type of biochar core that are produced from a predetermined biomass feedstock using a predetermined set of pyrolysis conditions and, optionally, secondary and/or tertiary treatment of the resultant biochar. For example, Feedstock A that is pyrolyzed under conditions G produce biochar core X. Feedstock A can be formed from a variety of biomass materials, so long as the biomass materials produce a blend of materials that exhibit properties that are within a specified range for feedstock A. Based on the properties of the feedstock, the conditions G are selected such that biochar core X will be formed. For example, pyrolysis time or temperature can be increased if the water content of the feedstock is increased. Conversely, pyrolysis time or temperature can be decreased if the water content of the feedstock is decreased. Alteration of the pyrolysis conditions based on the feedstock can allow for the production of biochar core X, which exhibits selected properties. Under certain circumstances, a feedstock can be chosen that does not fall within the specified range of properties for feedstock A. In this case, a biochar core that is not biochar core X may be formed.

The pyrolysis of a biomass material involves a wide range of parameters, relating to the feedstock and to the pyrolysis process, including the following parameters:

Biomass Related Parameters Include:
intrinsic properties of the biomass (e.g., original lignin, cellulose, hemi-cellulose, ash content and composition and extractives);
biomass pretreatment (e.g., additives/ash content and concentration, moisture, chemical composition, changes in the proportions of lignin, cellulose, hemi-cellulose and extractives);
biomass degree of polymerisation;
biomass density;
biomass particle size;
biomass particle shape; and
biomass physical and thermal properties (e.g., specific heat capacity, thermal conductivity, permeability).

Pyrolysis Reactor Operation Parameters Include:
reactor temperature;
temperature at which pyrolysis occurs at the surface, of the particle and/or at the geometric centre of the particle to assess completeness of pyrolysis;
product reactor residence time in the reactor;
product temperature in the reactor;
biomass heating rate and heat transfer;
biomass decomposition temperature or temperature range;
pressure (e.g., hydrostatic and mechanical); and
gaseous environment (e.g., gaseous environment in the reactor).

Parameters Relation to Recovery of the Final Products Include:
rate of thermal quenching of the products (e.g., char can be cooled with gas, liquid or solid) and
time/temperature profile of the cooling of the biochar.

One or more of these parameters, or any other parameters or conditions described herein, can be controlled to produce the biochar core products described herein. These parameters can be controlled to variable degrees and some parameters may have a greater influence on the properties of the pyrolysis products than others.

In some embodiments of the invention, materials can be fed to or removed from the pyrolysis unit under controlled conditions while the pyrolysis unit is operating. For example, syngas, bio-oil, biochar core, or any combination thereof produced during pyrolysis can be collected from the pyrolysis unit and used for heating of the pyrolysis unit, heat export, power generation or other applications including but not limited to the synthesis of chemicals and derived products. Alternatively, a biomass feedstock with or without reagents can be added to the pyrolysis unit during the pyrolysis process. The pyrolysis unit can have a plurality of stages. The pyrolysis unit can have a first stage for heating and/or pyrolyzing the biomass feedstock under a first set of conditions and a second stage for heating and/or pyrolyzing the biomass feedstock under a second set of conditions. The biomass feedstock can be transferred first to the first stage and then to the second stage. Alternatively, the biomass feedstock can be moved through the pyrolysis unit in a continuous mode. The biomass feedstock can be pyrolyzed under a plurality of conditions as the biomass feedstock moves through the pyrolysis unit, or conversely retained in the unit until the processing has been completed.

The pyrolysis unit can have one or more temperature sensors for monitoring and controlling the temperature of the biomass feedstock during pyrolysis. The temperature sensors can be positioned throughout the pyrolysis unit such that the temperature sensors provide effective monitoring of the temperature of the biomass feedstock, the surface temperature of the biomass feedstock, and/or the environment surrounding the biomass and/or reagents. Similarly, the pyrolysis unit can have one or more pressure and/or oxygen sensors for monitoring and controlling the amount of pressure acid/or oxygen in the pyrolysis unit. The pressure and/or oxygen sensors can be spaced throughout the pyrolysis unit for appropriate monitoring of the pressure and/or oxygen levels in the pyrolysis unit. Other instrumentation can be added as required to monitor and control the process.

Heat can be supplied to the pyrolysis unit using a variety of energy sources and in a variety of ways (hot gases, molten salts, hot sand, contact with heated metal surfaces, or microwaves). For example, energy sources can be combusted for the formation of heat, which can be transferred to the pyrolysis unit. Alternatively, microwave energy can be utilized for the pyrolysis of the biomass feedstock, as described in PCT Publication No. WO2008/079029, incorporated herein by, reference in its entirety.

The pyrolysis unit can be operated under predetermined reaction conditions such that one or more selected pyrolysis products are formed. For example, the pyrolysis unit can be controlled such that a biomass feedstock is heated at a specific rate to a desired temperature while being exposed to a specified level of oxygen. The specific rate can be up to about, about, or less than about 0.01, 1, 10, 100, or 1000.degree. C. per second, which can be determined at the reaction interface. The specific rate can be controlled to within about or less than about 5, 10, 20, or 40.degree. C. per second, which can be determined at the reaction interface or at the center of the particle. The temperature of the biomass feedstock, which can be the final or peak temperature, can be controlled to within about or less than about 100, 20, 10, or 5.degree. C. The final temperature of the pyrolyzed biomass can be a temperature up to about 200, 500, or 1000. degree C. The pyrolysis unit can be controlled such that the biomass feedstock is held at a specific temperature for a desired amount of time. The time can be controlled to within about or less than about 50, 5, or 0.5 minutes. The pyrolysis products can be formed within the pyrolysis unit in about, greater than about or less than about 0.001, 0.01, 0.1, 1, 2, 3, 4, 5, 6, 7, or 10 days.

Some conditions for performing pyrolysis are described in PCT Patent Publication No. WO2009/016381, incorporated herein by reference in its entirety. The pyrolysis or charring process can involve heating a biomass feedstock over 250. degree. C. under oxygen deficient conditions leading to its decomposition. Thus, the absence of an oxidizing agent, such as an acid, steam or air, may be preferred. The temperature will normally be selected according to the substance to be charred and the extent to which it is desired to remove unwanted compounds (organic or inorganic) or other contaminants. The process may not need to be sealed, as the heated material can give off volatile products (condensable and non-condensable). Air ingress to the pyrolysis unit can be minimized or obviated by the addition of inert gas purging ($N_2$, Ar (or other noble gas), combustion products ($CO_2$, CO, $H_2O$), steam or restricting the ingress of air by operating the unit under a positive pressure). In some embodiments of the invention, pyrolysis conditions can maximize production of energy in the form of a variety of products, such as syngas or Biooil.™, can maximize the production of a selected type of biochar, or can be optimized for a balance between energy production and biochar production. The selected type of biochar core can have particular characteristics, as described herein.

Some pyrolysis processes can be classified as slow pyrolysis or fast pyrolysis. Slow pyrolysis can be performed at temperatures of between 300 and 450. degree. C. Slow pyrolysis can involve heating biomass feedstock at a temperature rate between about 0.1 to 50. degree. C. per second. Fast pyrolysis can be performed at higher temperatures, which can be from 400-1000. degree. C., depending on whether liquids or gases are to be optimized and/or the nature of the feedstock. Fast pyrolysis can involve heating biomass feedstock at a temperature rate change, which can be determined at the reaction interface, between about 100 such that the volatile organics do not recondense in the pyrolysis reactor. In other embodiments of the invention, the reaction conditions can be such that the volatile organics recondense in the pyrolysis reactor, and in some cases, on the biomass feedstock. The rate of heating or the amount of heat applied can be such that the rate of release of volatile organics is less than about, about, or greater than about 75, 50, 30, 20, 10, 5, or 1% per hour of the total volatile organics present in the feedstock or that can be released by pyrolysis. The rate of heating or amount of heat applied can have multiple stages. For example, the rate of heating or amount of heat applied can be high and then low, or low and then high. In some embodiments of the invention, the rate of heating or amount of heat applied can change on a logarithmic, exponential, or linear scale. Examples of the range of possible values of pyrolysis conditions and properties of resultant chars, including amount of volatile products in chars, are given in Table 1.

TABLE 1

Properties of charcoal produced at various temperatures from *Acacia bussei* produced in a muffle furnace:

| Pyrolysis temp [° C.] | C [wt %] | H [wt %] | O$^a$ [wt %] | Ash [wt %] | Water [wt %] | Fixed Volatiles [wt %] | Gross Carbon [wt %] | Calorific Value [wt %] | Charcoal Yield$^b$ [MJ/kg] | Energy Yield$^b$ [%] |
|---|---|---|---|---|---|---|---|---|---|---|
| 300 | 30.2 | 5.67 | 63.73 | 0.4 | 1.9 | 70.8 | 28.8 | 22.4 | 56.27 | 65.92 |
| 400 | 71.5 | 3.93 | 22.17 | 2.4 | 2.8 | 30.9 | 66.7 | 29.88 | 28.03 | 43.80 |
| 500 | 87.0 | 3.10 | 8.50 | 1.4 | 2.8 | 17.7 | 80.9 | 32.14 | 22.65 | 38.07 |
| 600 | 87.5 | 2.67 | 6.91 | 2.9 | 1.0 | 7.1 | 90.0 | 33.20 | 21.63 | 37.56 |
| 700 | 92.4 | 1.71 | 3.89 | 2.0 | 1.8 | 3.9 | 94.1 | 33.40 | 20.16 | 34.22 |
| 800 | 93.4 | 1.01 | 3.57 | 2.0 | 1.1 | 2.4 | 95.6 | 33.90 | 19.54 | 34.64 |

Notes:
$^a$assumes no sulphur or nitrogen present; $^b$dry weight of charcoal divided by weight of wood; $^c$gross calorific value of charcoal multiplied by charcoal yield divided by gross calorific value of the wood.

to 1000. degree. C. per second. The yield of products from pyrolysis, and/or whether or not the pyrolysis is fast or slow, can vary with temperature, feedstock composition, feedstock size or feedstock shape, residence time and heating rate. In some embodiments of the invention, increased amounts of char can be created per unit biomass at the lower pyrolysis temperatures. High temperature pyrolysis can produce greater amounts of syngas from the biomass.

Fast Pyrolysis, including fast pyrolysis of soft or hardwood parades less than 6 mm in their maximum dimension at a reactor temperature of 450-525. degree. C., can yield about 75% bio-oil (which may include reaction water), 14% biochar, and 11% syngas, and decomposition of the feedstock can be completed in seconds. Slow pyrolysis can be optimized to produce substantially more biochar (which can be up to about .45-50 wt % of the dry ash free biomass) and can take on the order of hours to complete. In some embodiments, slow pyrolysis can be performed at high pressure.

The invention provides for methods for producing a biochar core that can have particular carbon and/or volatile carbon content. Biochar exhibiting these particular properties can be produced using selected pyrolysis conditions described herein. For example, a biomass feedstock is heated at a sufficiently slow rate and for a sufficient amount of time such that volatile organics are allowed to escape from the biomass and do not recondense within the pyrolysis reactor. The volatile organics can be removed from the pyrolysis reactor thereby preventing the volatile organics from recondensing in the pyrolysis reactor or on the pyrolyzing biomass. Alternatively, the reaction conditions can be Reference: Hollingdale, A. C., Krishnan, R., Robinson, A. P., "Charcoal Production A Handbook", Chapter 2, page 7, Eco-logic books, 1999, ISBN 1 899233 05 9 (which is incorporated herein by reference in its entirety).

The biomass feedstock can be heated for enough time and under sufficient temperature conditions that the biochar core product has a selected and/or controlled carbon content. The carbon content can be greater than about, about, or less than about 10, 20, 40, 60, 75, 80, 90, 95, 97, 99, or 99.5 wt %. The carbon content can be measured as a portion of the dry weight of the biochar.

The biomass feedstock can be heated for enough time and under sufficient temperature conditions that the biochar core product has a selected and/or controlled volatiles content. The volatiles content can be greater than about, about, or less than 90, 80, 50, 30, 25, 20, 15, 10, 5, 1, or 0.1. wt %. The volatiles content can be measured as a portion of the dry weight of the biochar or the total weight of the biochar.

In some embodiments of the invention, the pyrolysis conditions can be such that a selected biochar core has an elemental composition or physical characteristics as described herein. For example, the pyrolysis conditions can be such that biochar core has a selected content of carbon, nitrogen, oxygen, hydrogen, potassium, or phosphorous. Alternatively, the pyrolysis conditions can be such that the biochar core has a desired cation exchange capacity, density, porosity, pore size, average pore size, crystallinity, size distribution, surface area, surface area per mass, or adsorption capacity.

In some embodiments of the invention, the conditions for pyrolysis can include a temperature heating rate that is less than about 50, 10, 5, 1, or 0.1. degree. C. and a final temperature can of mater than about 500, 600, 700, 800, 900, or 1000. degree. C.

In some embodiments of the invention, completion of the pyrolysis process is determined by monitoring the rate of release of compounds from the biomass feedstock. Once the rate of release of compounds has decreased to about 0.5, 1, 5, 10, 20, or 50% of the maximum rate of release of compounds, the pyrolysis process may be deemed to have completed. The compounds that are monitored for release can be volatiles, organic carbons, volatile organic carbons, volatile carbons, water vapor or organic volatiles and/or permanent gases such as $CO_2$, CO, $H_2$, $CH_4$ and other higher hydrocarbons. Alternatively, the pyrolysis process can be performed until the biochar product formed has a volatile (volatile containing solid compounds, volatile organic compounds, or volatile carbon compounds) content of greater than about, about, or less than about 90, 80, 50, 30, 25, 20, 15, 10, 5, 1, or 0.1 wt %. The pyrolysis conditions can be such that the amount of volatiles in the biochar product can be controlled to within 0.1, 1, 5, or 10 wt %. The amount of volatiles can be measured by analysis of the composition of the biochar immediately after removal from the pyrolysis reactor or after post-pyrolysis treatment. In some embodiments, the percentage is determined as a percentage of total mass of the biochar. In other embodiments of the invention, the percentage is determined as a percentage of non-volatile carbons.

The invention provides for use of the pyrolysis products for the pyrolysis process. For example, the invention provides for post-heating: management of the pyrolysis products. Heat in the pyrolysis products can be recovered and/or used for the heating and: or drying and/or torrefaction of the biomass feedstock. Alternatively, the heat from the pyrolysis products can be used for the generation of energy. For example, heat from the pyrolysis products can be used to heat a steam generator for production of electricity or for activation of the biochar using steam, $CO_2$, or combination of thereof. In other embodiments of the invention, pyrolysis products can be used for the generation of energy, which can be used to power the pyrolysis process. The invention also provides for a variety of methods and processes to modify the pyrolysis products, described herein.

III. Biochar Post-Pyrolysis Treatment

In some embodiments of the invention, the pyrolyzed biomass is subjected to post-treatment. Post-treatment can be used to control the characteristics of the biochar core product, such that a specific biochar core product is formed. Post-treatment can include solvent washing, high temperature heating, gasification, sorting, grinding, chipping, or chopping. For example, pyrolyzed biomass can be subjected to an organic solvent wash to remove volatiles from the pyrolyzed biomass. Alternatively, the pyrolyzed biomass can be sorted for size and/or density, such that pyrolyzed biomass particles of a specified size and/or density distribution are grouped together.

IV. Biochar Core

The biochar core produced using the methods, devices, and systems described herein can have selected properties that improve the functional characteristics of the biochar core in a variety of applications. These properties can include the elemental composition of the biochar core, such as carbon, total carbon, organic carbon, total organic carbon, nitrogen, oxygen, hydrogen, potassium, or phosphorous content and other non-specified elements. The selected content levels of these elemental compositions within the biochar core can be any level described herein. Other selected properties of the biochar core can include cation exchange capacity, density, porosity, pore size, average pore size, crystallinity, size distribution, surface area, surface area per mass, or adsorption capacity. The porosity can be a fraction of the total volume greater than about, about, or less than about 0, 0.1, 0.2, 0.3, 0.4, 0.5, 0.6, 0.7, 0.8, 0.9, or 1.0. The pore size or average pore size can be in the range of 5 to 50 .mu.m. The pore size or average pore size can be greater than about, about, or less than about 0.01, 0.1, 1, 5, 10, 25, 50, 100, 200, 400, or 1000 .mu.m. The surface area can be greater than about, about, or less than about 1, 5, 50, 100, 300, 500, 750, 1000, 2500, or 5000 m$^2$ per gram.

The biochar core properties can be selected such that the biochar core is stable, inert and/or exhibits reduced degradation over time. The degradation of the biochar core can be through biotic, abiotic, chemical or oxidative reactions. The degradation can be measured by determining the amount of carbon in the biochar core as a percent of initial carbon in the biochar core after pyrolysis. The carbon can be organic carbon, inorganic carbon, or both inorganic and organic carbon. The rate of degradation can be about or less than about 20, 15, 10, 5, 2.5, 1, 0.5, or 0.1% per year. The rate of degradation can be measured over a time span of 1, 2, 5, or 10 years or longer. Alternatively, the rate of degradation can be measured over one, two, or three months in the first, second, third, fourth, or fifth year after production of the biochar core or after use of the biochar core for a particular purpose. The particular purpose can be use of the biochar core as a soil amendment, fertilizing agent, microbial delivery agent, or any other purpose described herein.

The rate of degradation can be controlled by selection of the properties of the biochar core. For example, the biochar core produced using the methods described herein can have a low volatile organic carbon content and/or a highly stable non-volatile component. This can reduce the degree that the biochar core can be degraded by microbial organisms that may utilize the biochar core as an energy or nutrient source. In some embodiments of the invention, the biochar core can have a controlled rate of degradation based on the form of carbon in the biochar core. These forms can include any of the forms described herein, and can be selected by a variety of parameters, including the type of biomass feed material. In other embodiments of the invention, post-pyrolysis treatments, such as annealing, can be used to control the rate of degradation of the biochar core. The biochar core can be produced such that it has a high carbon content and can easily degrade or be stable.

V. Biachar Functionalization

The biochar core and/or enhanced biochar core can be functionalized or processed by a variety of methods to form a functionalized biochar. For example, the biochar core can be sorted, chemically or physically treated, or supplemented with nutrients, chemicals, or organisms. In some embodiments of the invention, the biochar core can be sorted by size or density such that biochar core particles of a particular size, distribution or density are grouped together. Alternatively, the biochar core can be treated chemically and/or physically to form biochar with activated carbon. The activated carbon can have an increased surface area, porosity, water retention, or cation exchange capacity that allows for improved functional activity of the biochar core. For example, the biochar with activated carbon can have increased capacity to hold nutrients or microbial inoculants.

In some embodiments of the invention, the biochar core or activated biochar core are mixed or blended with a supplement. The supplement can include inorganic chemicals such as fertilizers and nutrients. Alternatively, the supplement can include organic materials with properties that increase the CEC, nutrient content or performance of biochar as a microbial habitat or it may be organisms such as fungi or bacteria or combinations of thereof.

The chemicals that can be mixed with the biochar core include nitrogen, phosphorous, potassium, calcium, sulphur, and magnesium sources. The sources can be in the form of fertilizer, compost, manure, ammonia, ammonium nitrate, urea, lime, limestone, rock phosphate, salt peter, gypsum, crop or other inorganic and organic compound containing these elements.

The biochar products can be supplemented with nutrient sources or other materials, such as those described herein, to form a biochar product with a known, desired, or selected amount of nutrients or other materials.

Organisms that can be supplemented to the biochar core can include fungi and bacteria. In some embodiments of the invention, the biochar core can be supplemented with trichoderma. Examples of trichoderma are discussed in U.S. Pat. No. 6,060,507, incorporated herein by reference in its entirety.

Other organisms can include Accumulibacter phophatis, Anabaena, Azolla, Bacillus circulars, Bacillus subtilis var natto, Bifidobacterium animalis, Bifidobacterium bifidum, Bifidobacterium longum, Deinococcus radiodurans, Lactobacillus acidophilus, Lactobacillus buchneri, Lactobacillus bulgaricus, Lactobacillus casei, Lactobacillus delbrueckii, Lactobacillus plantarum, Lactococcus diacetylactis, Lactococcus lactis, Mycorrhiza, Pseudomonas aeruginosa, Pseudomonas putida, Ralstonia metallidurans, Rhizobia, Rhodobacter, Rhodopseudomonas palustris, Rhodopseudomonas sphaeroides, Saccharomyces cerevisiae, Streptococcus thermophilus, Ulocladium oudemansii, or Xanthomonas maltophilia. The rhizobacteria can be a rbizobium plant growth promoting rbizobacteria. Combinations of these organisms can be supplemented to a biochar core. A combination of organisms can be chosen based on the symbiotic relationships between organisms and the desired functionality of the biochar core. For example, thiobacteria can be supplemented to a biochar core for forming a bioremediation agent.

Organisms that can be supplemented to the biochar core can be organisms that have been identified as an efficient microorganism. These organisms can control the growth of fungus or other adverse species. Alternatively, these organisms can be used for the generation of nutrients that are beneficial to the growth of particular organisms, such as plants. For example, some organisms ran be used to increase the rate of nitrogen fixation in soil.

The organisms can be added to the biochar core along with nutrients that may allow the organisms to remain viable until the biochar is applied to a particular site. In other embodiments of the invention, organisms can be added to the biochar core without nutrients or selected nutrients or with or without organic supplements. The functionalized biochar can be designed such that a sufficient amount of colony-forming units of an organism are present upon application of the functionalized biochar to a site for inoculation by the organism.

VI. Biochar Applications

The methods of the invention provide for the use of biochar for a variety of purposes. The biochar can be used as a soil amendment, potting mix, a substitute in a growing media (including peat and/or compost media), a horticultural media, a carbon sequestration agent, a fertilizing agent, a turfgrass establishment, a bioremediation agent, a delivery agent for a fungi or bacterial population, a synthetic "terra preta" (or equivalent material) or any combination thereof.

In some embodiments of the invention, the biochar is used for carbon sequestration by fixing of carbon in the soil in a recalcitrant form. An example of the use of biochar for carbon sequestration is described in U.S. Patent Application No. 2004/0111968, incorporated herein by reference in its entirety. When the biochar is used for carbon sequestration, the biochar core is selected to have resistance to degradation, as described herein. The time scale for the biochar core can be greater than about, less than about, or on the order of hundreds of years.

In other embodiments of the invention, biochar or an enhanced and/or functionalized biochar can be used for mitigation of soil greenhouse gas emissions. For example, an enhanced and/or functionalized biochar can be used to reduce emission of methane or nitrogen containing gases, such as nitrous oxide.

In other embodiments of the invention, the biochar is used for on-demand release of chemicals or other materials. These chemicals can be fertilizers, nutrients, or other materials that are depleted over time at a particular site. The chemicals can also be chemicals that create a protective environment for a desired organism to be grown, e.g., pesticides or insecticides or other chemicals that may attract or support beneficial organisms. The fertilizers, nutrients, or other materials can be depleted by organisms such as plants and microbes. The chemicals can be released from the biochar based on the concentration of the fertilizer, nutrients, or other materials in the surrounding environment. The release of the chemicals can be such that the concentration of the chemical in the surrounding environment is maintained at a relatively constant level.

The biochars described herein can be used to enhance agricultural output, horticultural qualities, or turf grass. For example, biochars can be used to improve the yield of an agricultural crop and/or to improve the resistance of the crop to detrimental environmental effects. Detrimental environmental effects can include harmful organisms, e.g., harmful fungi or insects, diseases, drought, low water, heat, wind, cold, frost, pollution, saline-containing water, and polluted water. In some embodiments of the invention, the biochars described herein can improve water retention, drainage, aeration, or the effects of compaction. In other embodiments of the invention, the biochars can be used to improve crop quality or nutritional value. Blends of organism, nutrient, and biochar can be used to form "terra preta" soil. A discussion of terra preta can be found in PCT Publication No. WO 2009/021528 and U.S. Patent Publication Nos. 2004/0111968 and 2007/0148754, each of which are incorporated herein by reference in its entirety.

The biochars described herein can lead to increased crop yield, lower use of water or irrigation, less nutrient run-off, reduced fertilizer use and cost, reversed soil degradation, and elimination, reduction, or avoidance GHG emission from soil.

The biochars that can be produced using the methods and systems described herein can be used to reduce pollution in water run-off streams and also to improve retention of water. The biochars can be used to remove phosphorous and nitrogen compounds from water streams or from other sources. The biochars can be used to protect ground water and other water bodies from undesired effects. For example, biochar can be distributed at an agricultural site or a farming location such that runoff or other undesired materials do not contaminate the ground water or other bodies of water.

In some embodiments of the invention, biochar is produced that can be used for bioremediation. The biochar can be designed to absorb toxic chemicals or have organisms that can convert the toxic chemicals to less harmful chemicals. Examples of using biochar for bioremediation are discussed in PCT Publication No. WO2009/016381, incorporated herein by reference in its entirety.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

We claim:

1. A article of manufacture comprising:
   a. a biochar core that is stable and has a degradation rate of less than 2.5% a year;
   b. wherein said biochar core is produced from a biomass that is pyrolized at:
      (i) a heating rate between about 0.1 C./second and 50.degree.C./second,
      (ii) a temperature greater than 250.degree. C., and
      (iii) a heating time greater than about 0.01 days.

2. The article of manufacture of claim 1, wherein the rate of degradation of said biochar core is less than 0.5% per year.

3. The article of manufacture of claim 1, wherein the rate of degradation of said biochar core is determined by measuring the loss of carbon.

4. The article of manufacture of claim 3, wherein the carbon of said biochar core is organic carbon.

5. The article of manufacture of claim 1, wherein the degradation of said biochar core is oxidative, chemical, biotic, or abiotic degradation.

6. The article of manufacture of claim 1, wherein the rate of degradation of said biochar core is less than 2.5% per year over a ten year period.

7. The article of manufacture of claim 1, wherein said biochar core has a surface area greater than about 300 $m^2$ per gram.

8. The article of manufacture of claim 1, wherein a porosity of said biochar core is less than about nine-tenths of the total volume of said biochar core.

9. An article of manufacture comprising:
   a. a biochar core that has a carbon content greater than about 75% of the dry weight of the biochar; and
   b. wherein said biochar core is produced from a biomass that is pyrolyzed under:
      i. a heating rate between about 0.1.degree Celsius a second and 50.degree. C./second:
      ii. a temperature greater than 250.degree. Celsius; and
      iii. a heating time greater than about 0.01 days; and combining the biochar core with a supplement to produce a functionalized biochar.

10. The article of manufacture of claim 9, wherein said biochar core has a volatile compound concentration of less than about 15 wt %.

11. The article of manufacture of claim 9, wherein the biomass has a biomass carbon content and the biochar core carbon content is greater than the biomass carbon content.

12. The article of manufacture of claim 9, wherein the biochar core has a specified nitrogen, phosphorus, or potassium content.

13. The article of manufacture of claim 9, wherein the biochar core comprises pores having a pore size range between about 5 to 50 microns.

14. The article of manufacture of claim 9, wherein the biochar core comprises pores having an average pore size of about 25 microns.

15. The article of manufacture of claim 9, wherein the biochar core that has a biochar core volatiles content less than about 30 wt % of the biochar.

16. The article of manufacture of claim 9, further comprising supplementing said biomass with a feedstock having an ash content greater than about 5%.

17. The article of manufacture of claim 9, further comprising subjecting said biomass to cutting, crushing, grinding, screening or breaking prior to providing said biomass to said pyrolysis unit.

18. The article of manufacture of claim 9, wherein said temperature is greater than about 500.degree. C.

19. The article of manufacture of claim 9, wherein the biochar core has a surface area greater than about 300 $m^2$ per gram.

20. The article of manufacture of claim 9, wherein a porosity of the biochar core is less than about nine-tenths of the total volume of the stable biochar core.

* * * * *